June 9, 1936.  A. J. McMASTER  2,043,671

LIGHTING SYSTEM CONTROLLED BY PHOTOELECTRIC CELL

Filed April 6, 1931

Inventor
Archie J. McMaster
By George E. Mueller
Atty.

Patented June 9, 1936

2,043,671

UNITED STATES PATENT OFFICE 2,043,671

LIGHTING SYSTEM CONTROLLED BY PHOTOELECTRIC CELL

Archie J. McMaster, Chicago, Ill., assignor to G-M Laboratories, Inc., Chicago, Ill., a corporation of Illinois Application April 6, 1931, Serial No. 528,219

5 Claims. (Cl. 250—41.5)

My invention relates to a photo-electric system and more particularly to a lighting system controlled by a photo-electric cell.

In controlling illumination, that is, turning on artificial lights when the natural illumination drops below a predetermined level, the gradual drop of illumination on the light sensitive cell which is connected directly to a relay or through an amplifier to a relay is apt to cause the relay device to chatter—that is, to operate more than once before the illumination has decreased sufficiently to produce a positive action of the relay. In fact, the illumination may decrease and again slightly increase and again decrease, producing the result of the lights going on and off several times, which action is quite undesirable in installations of automatic light control in public places, such as streets, railway terminals, etc.

In accordance with the general features of the invention I provide means for establishing an increment or decrement of light change necessary to obtain relay action so that after the relay has once turned on the artificial lights or once turned them off, the natural illumination must change by a predetermined amount before the relay will again operate. Thus, if the natural illumination drops to a critical value which has been predetermined or set, the artificial lights will be turned on and they will not go off until the natural illumination rises to a definite value above the value at which they were turned on.

An object of the present invention is to provide a new and improved photoelectric system.

A further object is to provide a system including a relay in which the relay will be operated only upon a definite increment or decrement in the factors causing its operation.

A further object is to provide a system for automatically controlling an artificial lighting system.

A further object is to provide a control system for artificial light which will prevent the lights from going off and on with small changes in the natural light.

A further object is to provide a light responsive relay which will not chatter.

Other objects and advantages will appear as the description proceeds.

Referring to the drawing.

Figure 1:
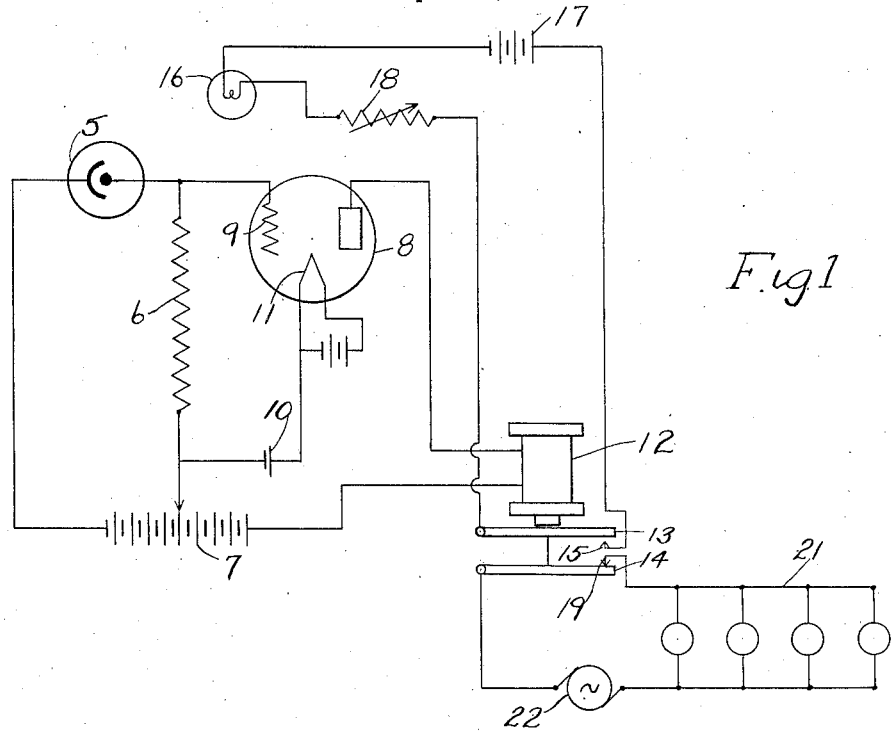
Fig. 1 is a diagrammatic illustration of a system embodying my invention.

In Fig. 1 a photoelectric cell 5 is shown having a resistance element or resistor 6 in its anode circuit and the cell is connected across a portion of a direct current source 7.

A thermionic amplifier tube 8 has its grid 9 connected to the upper end of resistor 6 and its filament 11 connected to the lower end of this resistor. A small biasing battery 10 may be included in the grid circuit of tube 8 to control the light level at which the system is to be operated. The anode circuit of this tube includes a relay 12 and is connected across another portion of the direct current source 7. Thus the change of light on the cathode of photoelectric cell 5 causes the potential across resistor 6 to be impressed upon the grid circuit of tube 8 in which the current is amplified in a manner well known in the art.

Relay 12 has two armatures 13 and 14, which move in unison. The armature 13 cooperates with a contact 15 to close a circuit to a lamp 16. This circuit includes a source of current 17 and a variable resistance element 18 for regulating the candle power of lamp 16. The armature 14 cooperates with a contact 19 to control a lighting circuit 21, which is connected to any suitable source of lighting current 22.

As an example of the operation of this device, let it be assumed that the lamp 16 is of such candle power and so spaced from the photoelectric cell so as to provide a luminosity of one foot candle at the photoelectric cell. When the natural illumination upon the photoelectric cell drops to, say, three foot candles, the photoelectric cell and the associated relay cause the artificial lights to be turned on by causing the armatures 13 and 14 to rise, closing contact 19 and opening contact 15. This extinguishes the lamp 16. Thus, at the time the illumination from natural sources on the cell is three foot candles the actual illumination on the cell is four foot candles on account of the auxiliary lamp. At the critical point when the natural illumination drops below three foot candles the relay operates to extinguish the auxiliary lamp, thereby decreasing the illumination on the cell to such an extent that the natural illumination on the photoelectric cell would have to increase to four foot candles or more before the artificial lights would be turned off. It will be seen that when the artificial lights are turned off, as for instance, in the morning, when the natural light upon the photoelectric cell increases, the lamp 16 will again be illuminated to add to the natural light, thereby requiring a greater natural darkness to turn on the lights than was required to turn them off.

Figure 2:
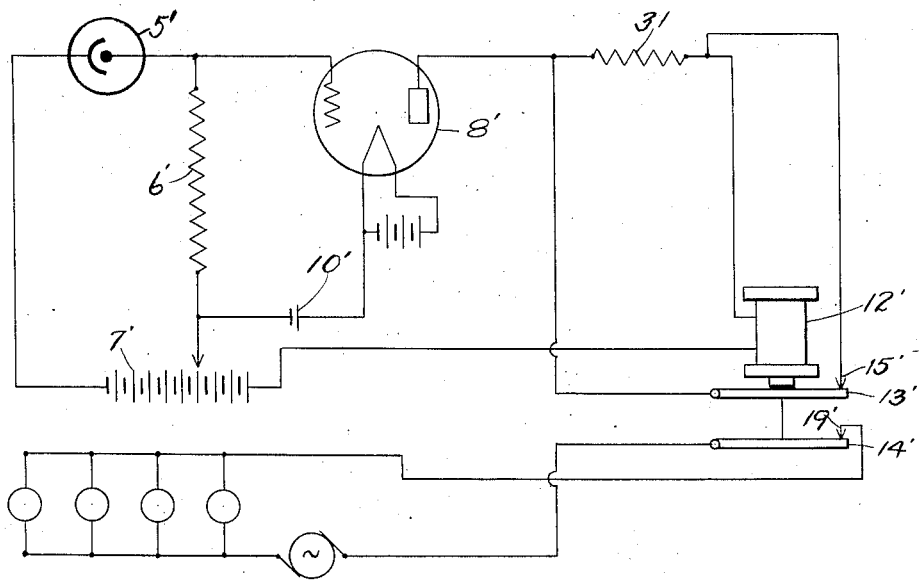
Fig. 2 is a similar illustration of a modified form of the invention.

Fig. 2 illustrates a modified form of the invention having a photoelectric cell 5' provided with a resistance element or resistor 6' in its anode circuit. The photoelectric cell circuit is connected to a thermionic amplifier tube 8' having a relay 12' in its anode circuit and the photoelectric cell and thermionic tube derive their anode current from a source 7'. The tube 8' may have a biasing battery 10' in its grid circuit to control the light level at which the system is to be operated. In series with the relay 12' and included in the anode circuit of tube 8' is a resistance element or resistor 31. One side of this resistor is connected to armature 13' and the other side of the resistor is connected to contact 15'. When there is a large amount of light on photoelectric cell 5', the current in relay 12 will be low and armatures 13' and 14' will remain in their lower positions, in which case resistor 31 will be included in series with the relay. When the light on the photoelectric cell 5' decreases, the current through relay 12' will increase and move armatures 13' and 14' to their uppermost positions, closing contacts 15' and 19'. The closing of contact 15' shunts the resistor 31 out of the anode circuit and still further increases the current through the relay so that the contacts will not again be opened until the current through relay 12' decreases by a predetermined amount. The decrease of current through the relay 12' causes contacts 15' and 19' to open and the opening of contact 15' will again tend to further decrease the relay current on account of the inclusion of resistor 31 in series therewith.

The circuits just described provide a simple and efficient system for controlling artificial lights automatically, although it will be evident that other circuits may be controlled in the same manner and the invention is not limited to the particular type of circuit controlled by the photoelectric cell system.

It will be understood that the nature and embodiments of the invention herein described and illustrated are merely convenient and useful forms of the invention and many changes and modifications may be made therein without departing from the spirit and scope of the invention.

What I claim as new and desire to protect by Letters Patent of the United States is:—

1. A photoelectric system comprising a photoelectric cell, an amplifying valve controlled thereby, an angle circuit for said valve, a lighting system, means in said anode circuit for de-energizing said lighting system when the light in said cell rises to a predetermined value, a resistor, and means for altering said anode circuit by effectively removing said resistor from said anode circuit in response to the operation of the first mentioned means so as to maintain said de-energization until the light in said cell reaches a definite decremet below said value.

2. A thermionic valve having a grid, a cathode and an anode, a grid circuit therefor, a photoelectric cell in said grid circuit, an anode circuit for said valve, a relay in said anode circuit controlled by said photoelectric cell, a resistor, and means for effectively introducing said resistor into said anode circuit and for removing it therefrom in response to the operation of said relay, so as to cause the difference between the illumination values at which the relay operates to be in excess of that difference which is causd by the inherent characteristics of the relay itself.

3. In a photoelectric lighting control system for maintaining a degree of illumination above a predetermined minimum, the combination with a lighting system, of a thermionic tube having a grid, cathode and anode, an anode-cathode circuit of said tube, a relay having a coil in said circuit, said relay having two sets of contacts, one of which controls said lighting system, a photoeelctric tube connected to the grid of the thermionic tube whereby said photoelectric tube is effective through said grid to control said anode-cathode circuit of the thermionic tube, and means including the other set of relay contacts in said anode-cathode circuit for increasing and decreasing the resistance of said anode-cathode circuit in response to the operation of the relay so that when the lighting system is turned on by the photoelectric tube acting through the thermionic tube and relay the relay will be maintained in that condition until the value of the illumination on the photoelectric cell reaches a definite decrement below the value at which the lighting system was turned on.

4. A relay having a coil and contacts, an electric circuit for supplying current to said coil for controlling and operating the relay, a resistor, and means including contacts of the relay for effectively connecting said resistor to said circuit and for disconnecting the same in response to the operation of the relay so that when the relay operates in response to an increase of current, the current is further increased by the operation of said contacts whereby to maintain the relay in its operated condition and to prevent further operation until the current decreases an amount in excess of the decrease required by the inherent characteristics of the relay alone.

5. A relay having a coil and contacts, an electric circuit for supplying current to said coil and for controlling and operating the relay in accordance with and in response to changes in a physical condition including means for controlling the current in said circuit in accordance with said physical condition, a resistor, and means including contacts of the relay for effectively connecting said resistor to said circuit and for disconnecting the same in response to the operation of the relay so that when a change of said physical condition in one direction causes an increase of current in the relay coil to such an extent as to operate the relay, the current is further increased by the operation of said contacts to maintain the relay in its operated condition and to prevent further operation until said physical condition changes in the opposite direction by an amount in excess of the change required by the characteristics of the relay alone.

ARCHIE J. McMASTER.